(12) United States Patent
Lopes (10) Patent No.: US 9,435,299 B2
(45) Date of Patent: Sep. 6, 2016

(54) FLUID SYSTEM AND METHOD OF MAKING AND USING THE SAME

(71) Applicant: GM Global Technology Operations LLC, Detroit, MI (US)

(72) Inventor: Shailesh M. Lopes, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 91 days.

(21) Appl. No.: 14/191,599

(22) Filed: Feb. 27, 2014

(65) Prior Publication Data

US 2015/0240759 A1 Aug. 27, 2015

(51) Int. Cl.
| | |
|---|---|
| *F02M 31/00* | (2006.01) |
| *F02M 31/16* | (2006.01) |
| *B60K 15/03* | (2006.01) |
| *B60K 15/073* | (2006.01) |
| *F02M 37/00* | (2006.01) |
| *F02M 37/22* | (2006.01) |
| *F02B 3/06* | (2006.01) |
| *F02D 19/08* | (2006.01) |

(52) U.S. Cl.
CPC .............. *F02M 31/00* (2013.01); *B60K 15/03* (2013.01); *B60K 15/03006* (2013.01); *B60K 15/03177* (2013.01); *B60K 15/073* (2013.01); *F02M 31/16* (2013.01); *F02M 37/0082* (2013.01); *F02M 37/223* (2013.01); *B60K 2015/0344* (2013.01); *B60K 2015/03065* (2013.01); *B60K 2015/03236* (2013.01); *B60K 2015/03427* (2013.01); *B60Y 2410/13* (2013.01); *F02B 3/06* (2013.01); *F02D 19/084* (2013.01); *Y02T 10/126* (2013.01); *Y02T 10/36* (2013.01); *Y10T 29/4935* (2015.01)

(58) Field of Classification Search
CPC ...... F02M 31/00; F02M 31/02; F02M 31/16; F02M 37/0082; F02M 37/223
See application file for complete search history.

(56) References Cited

U.S. PATENT DOCUMENTS

| | | | | |
|---|---|---|---|---|
| 5,611,392 | A * | 3/1997 | Malecek et al. | 165/47 |
| 2002/0193028 | A1* | 12/2002 | Zuckerman et al. | 442/328 |
| 2012/0312279 | A1* | 12/2012 | Powell | 123/456 |

* cited by examiner

*Primary Examiner* — Lindsay Low
*Assistant Examiner* — Jacob Amick
(74) *Attorney, Agent, or Firm* — BrooksGroup (57) ABSTRACT

A number of variations may include a product including a housing including at least one phase change material and a medium constructed and arranged for thermal energy transfer to or from a vehicle fuel.

22 Claims, 5 Drawing Sheets

| NON-RENEWABLE PCMs IN TEMPERATURE RANGE OF INTEREST FOR ETHANOL HEATING |||||
|---|---|---|---|---|
| ETHANOL FUEL OPERABILITY TEMPERATURES | PCM COMPOUND | TYPE | MELTING POINT (°C) | HEAT OF FUSION (KJ/Kg) |
| >12° | 34% $C_{14}H_{28}O_2$ + 66% $C_{10}H_{20}O_2$ | ORGANIC EUTHETIC | 24 | >150 |
| | PARAFFIN MIX, C13-C24 | ORGANIC | 21-24 | >150 |
| | HEPADECANE | ORGANIC | 22 | >200 |
| | HEPADECANE | ORGANIC | 19 | >200 |
| | HEPADECANE | ORGANIC | 18 | >200 |
| | GLYCERIN | ORGANIC | 18 | >200 |
| | ACETIC ACID | ORGANIC | 16 | >150 |
| | 55-65% $LiNO_3 \cdot 3H_2O$ + 35-45% $Ni(NO_3)_2$ | INORGANIC | 24 | >200 |
| | 45% $Ca(NO_3)_2 \cdot 6H_2O$ + 55% $Zn(NO_3)_2 \cdot 6H_2O$ | INORGANIC | 25 | >140 |
| | 66.6% $CaCl_2 \cdot 6H_2O$ + 33.3% $MgCl_2 \cdot 6H_2O$ | INORGANIC | 25 | >140 |

| RENEWABLE PCMs IN TEMPERATURE RANGE OF INTEREST FOR ETHANOL HEATING |||||
|---|---|---|---|---|
| ETHANOL FUEL OPERABILITY TEMPERATURES | PCM COMPOUND | TYPE | MELTING POINT (°C) | HEAT OF FUSION (KJ/Kg) |
| >12° | ETHYL PALMITATE | RENEWABLE ORGANIC | 24-26 | >150 |
| | MIX OF MYRISTIC ACID + CAPRIC ACID | RENEWABLE ORGANIC | 22-26 | >150 |
| | MIX OF MYRISTIC ACID + LAURIC ACID | RENEWABLE ORGANIC | 19-21 | >150 |
| | BUTYL STEARATE | RENEWABLE ORGANIC | 19 | >150 |
| | METHYL MYRISTATE | RENEWABLE ORGANIC | 18 | >200 |
| | 45-55 WT% CAPRIC + 45-55% LAURIC ACID | RENEWABLE ORGANIC | 18 | >200 |
| | CAPRYLIC ACID | RENEWABLE ORGANIC | 16 | >150 |
| | PROPYL PALMITATE | RENEWABLE ORGANIC | 16-19 | >150 |
| | ISOPROPYL STEARATE | RENEWABLE ORGANIC | 14-18 | >150 |

Fig.3

| NON-RENEWABLE PCMs IN TEMPERATURE RANGE OF INTEREST FOR DIESEL HEATING | | | | |
|---|---|---|---|---|
| DIESEL FUEL OPERABILITY TEMPERATURES | PCM COMPOUND | TYPE | MELTING POINT (°C) | HEAT OF FUSION (KJ/Kg) |
| 15°C TO -0°C | HEPTADECANE | ORGANIC | 19 | >200 |
| | HEXADECANE | ORGANIC | 18 | >200 |
| | GLYCERIN | ORGANIC | 18 | >200 |
| | ACETIC ACID | ORGANIC | 16 | >150 |
| | PENTADECANE | ORGANIC | 10 | >200 |
| | TETRABUTYLAMMONIUM BROMIDE (TYPE A AND TYPE B) | ORGANIC | 10 TO 12 | >150 |
| | FORMIC ACID | ORGANIC | 8 | >200 |
| | TETRADECANE | ORGANIC | 5 | >200 |
| | TETRAHYDROFURAN (THF) | INORGANIC | 5 | >200 |
| | 45-52WT% LiNO3.3H2O+48-55 WT%Zn(NO3)2.6H2O | INORGANIC | 17 | >200 |
| | 55 WT%CaCl2.6H2O+55 WT%CaBr2.6H2O | INORGANIC | 15 | >150 |
| 0°C TO -10°C | H2O – POLYACRYLAMIDE | COMPOUND | 0 | >200 |
| | TRIDECANE | ORGANIC | -5 | >200 |
| | DODECANE | ORGANIC | -10 | >200 |
| | TRIETHYLENE GLYCOL | INORGANIC | -7 | >200 |
| | DIETHYLENE GLYCOL | INORGANIC | -7 TO -10 | >200 |
| | KCl(19.5WT%) + H2O | INORGANIC | -11 | >200 |
| -10°C TO -30°C | DODECANE | ORGANIC | -10 | >200 |
| | UNDECANE | ORGANIC | -26 | >200 |
| | NaCl(22.4WT%) + H2O | INORGANIC | -21 | >200 |
| | Al(NO3)3(30.5WT% - H2O) | INORGANIC | -31 | >150 |

| RENEWABLE PCMs IN TEMPERATURE RANGE OF INTEREST FOR DIESEL HEATING | | | | |
|---|---|---|---|---|
| DIESEL FUEL OPERABILITY TEMPERATURES | PCM COMPOUND | TYPE | MELTING POINT (°C) | HEAT OF FUSION (KJ/Kg) |
| 15°C TO -0°C | 45-55 WT% CAPRIC + 45-55% LAURIC ACID | RENEWABLE ORGANIC | 18 | >200 |
| | METHYL MYRISTATE | RENEWABLE ORGANIC | 18 | >200 |
| | CAPRYLIC ACID | RENEWABLE ORGANIC | 16 | >150 |
| | PROPYL PALMITATE | RENEWABLE ORGANIC | 16-19 | >150 |
| | ISOPROPYL STEARATE | RENEWABLE ORGANIC | 14-18 | >150 |
| | 90%CAPRIC ACID + 10% LAURIC ACID | RENEWABLE ORGANIC | 13 | >150 |
| | OLEIC ACID | RENEWABLE ORGANIC | 11 TO 13 | >150 |
| | 80 WT% METHYL OLEATE + 20WT% METHYL PALMITATE | RENEWABLE ORGANIC | 12 | >150 |
| | 80-60 WT% OLEIC + 20-40 WT% LINOLEIC ACID | RENEWABLE ORGANIC | 5 TO 10 | >140 |
| | ISOPROPYL PALMITATE | RENEWABLE ORGANIC | 10 | >150 |
| | METHYL LAURATE | RENEWABLE ORGANIC | 5 | >150 |
| 0°C TO -10°C | ISOPROPYL MYRISTATE | RENEWABLE ORGANIC | 5 | >150 |
| | METHYL LAURATE | RENEWABLE ORGANIC | 4 | >150 |
| | MIXTURE OF ETYL AND METHYL LAURATE | RENEWABLE ORGANIC | 0 TO -5 | >150 |
| | ETHYL LAURATE | RENEWABLE ORGANIC | -10 | >150 |
| -10°C TO -30°C | LINOLEIC ACID | RENEWABLE ORGANIC | -5 | >150 |
| | METHYL OLEATE | RENEWABLE ORGANIC | -20 | >150 |

FLUID SYSTEM AND METHOD OF MAKING AND USING THE SAME

TECHNICAL FIELD

The field to which the disclosure generally relates to includes engines including, but not limited to, engines for vehicles.

BACKGROUND

Currently, some engines have fuel clogging issues pertaining to the physical characteristics of the fuels used and the surrounding conditions.

SUMMARY OF ILLUSTRATIVE VARIATIONS

A number of variations may include a product including a housing, comprising at least one phase change material and a medium, wherein the housing may be constructed and arranged from thermal energy transfer to or from a fuel.

A number of variations may include a product including a fuel system for use in at least one vehicle component comprising a housing, comprising at least one phase change material and a medium, wherein the housing may be constructed and arranged from thermal energy transfer to or from a fuel.

A number of variations may include a method including providing a product including a housing, comprising at least one phase change material and a medium, wherein the housing may be constructed and arranged for thermal energy transfer to or from a vehicle fuel; providing a vehicle comprising a container comprising vehicle fuel; placing the product so that the medium may be in contact with or adjacent to the container of vehicle fuel or the fuel itself; transferring heat to the fuel from the phase change material or transferring heat from the fuel to the phase change material.

Other illustrative variations within the scope of the invention will become apparent from the detailed description provided hereinafter. It should be understood that the detailed description and specific examples, while disclosing optional variations of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein:

FIG. 4 is a table of non-limiting examples of applicable phase change materials according to a number of variations.

DETAILED DESCRIPTION OF ILLUSTRATIVE VARIATIONS

The following description of the variations is merely illustrative in nature and is in no way intended to limit the scope of the invention, its application, or uses.

Figure 1:
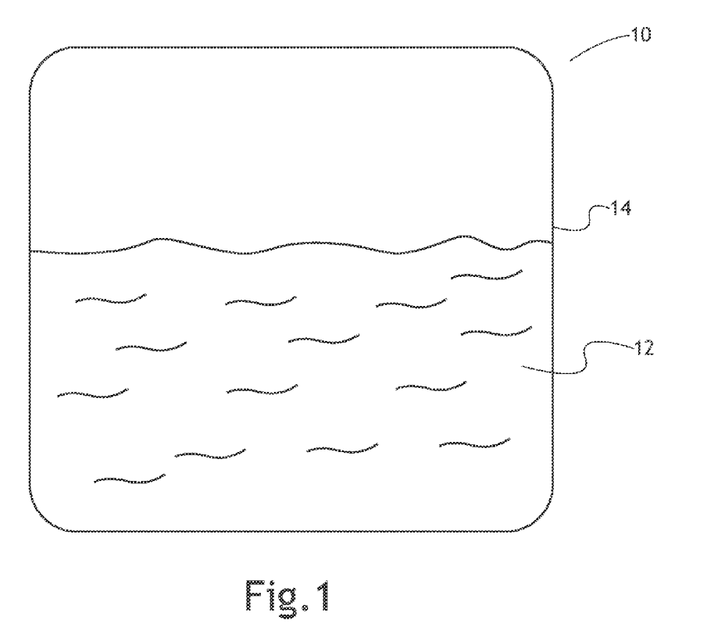
FIG. 1 is an illustration of a product and method according to a number of variations.

FIG. 1 shows an illustration of a product according to a number of variations. In a number of variations, a product comprises a housing 10. The housing 10 may further comprise a phase change material 12 and a medium 14. The medium 14 may be constructed and arranged for thermal energy transfer to or from the phase change material 12 to the surroundings 20 of the housing 10. In a number of variations, the surroundings 20 may comprise a vehicle component. In a number of variations, the vehicle component may comprise a vehicle engine 22. In a number of variations, the surroundings 20 and/or the vehicle engine 22 may comprise a fuel 16. In a number of variations, the vehicle engine 22 may comprise a fuel filter 40, fuel tank 42, fuel line 44, or may comprise another vehicle component wherein fuel 16 may be present. In a number of variations, the vehicle engine 22 may operate in a set of conditions 30 including but not limited to, temperature and pressure of the surroundings 20. In a number of variations, the phase change material 12 may comprise a material with a freezing, gel, or cloud point at or slightly above the freezing, gel, or cloud point of the fuel 16. In a number of variations, the phase change material 12 may provide instantaneous heat to the fuel 16 upon the onset of undesirable conditions 30. Undesirable conditions 30 may be herein defined as conditions such as, but not limited to, temperature or pressure, that may cause a fuel 16 to at least partially gel, cloud, wax, or otherwise solidify within the surroundings 20. Desirable conditions 32 may be herein defined as conditions that may not be undesirable conditions 30. In a number of variations, the housing 10 may be constructed and arranged to aid in improving cold start and cold weather performance of the vehicle. In a number of variations, the fuel 16 may provide heat to the phase change material 12 upon the onset of desirable conditions.

Figure 3:
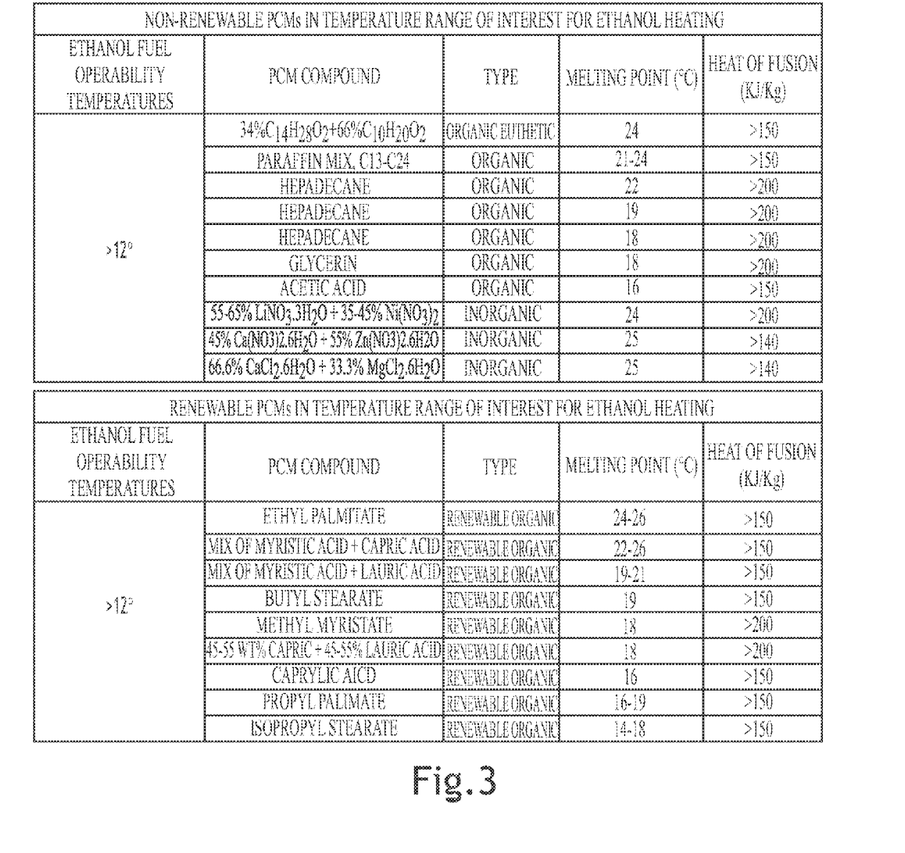
FIG. 3 is a table of non-limiting examples of applicable phase change materials according to a number of variations.

Still referring to FIG. 1, in a number of variations, the housing 10 may comprise a phase change material 12. In a number of variations, the phase change material 12 may be tailored to the type of fuel 16 used to optimize performance at the onset or in undesirable conditions 30. For example, a set of non-limiting variations of phase change materials 12 that may be useful for an ethanol based fuel 16 may be found in Table 3. Further as an example, a set of non-limiting variations of phase change materials 12 that may be useful for a diesel based fuel 16 may be found in Table 4. In a number of variations, the phase change material 12 may be organic or inorganic. In a number of variations, the phase change material 12 may be renewable or non-renewable. In a number of variations, the phase change material 12 may be self-contained. In a number of variations, the phase change material 12 may be non-divided, or otherwise complete as one mass within the medium 14 of the housing 10. In a number of variations, the phase change material 12 may be micro-encapsulated to form encapsulated microspheres. In a number of variations, the phase change material 12 may be microencapsulated by a polymer. In a number of variations, the polymer may be polyuria-formaldehyde. In a number of variations, the microencapsulation of the phase change material may be done by spray drying, use of organic solvents, fluidized bed processes, centrifugal process, in situ polymerization technique, or may be done another way.

In a number of variations, the housing 10 may further comprise a medium 14 wherein the medium 14 comprises a layer or a plurality of layers. In a number of variations, the medium 14 may comprise a fabric or fiber or a plurality of fibers. In a number of variations, the medium 14 fabric or fiber may be textile, polymeric, natural, synthetic, or may be another type. In a number of variations, the fabric or fiber may be a material including, but not limited to, shellac, amber, aramid (including Twaron, Kevlar, Technora, Nomax), silk, rubber, synthetic rubber, phenol formaldehyde, neoprene, nylon, polyvinyl chloride, polystyrene, polyethylene, polypropylene, polyacrylonitrile, PVB, silicone, plastic, bioplastic, PET, PVDC, PA PTFE, PEO, PPY, PANI, PT, PPS, PPV, PAC, polyester, vinyl polymer, polyolefin, polyacetylene, phenolic resin, polyanhydride, epoxy, phenolic, polyimide, PEEK, alumina, beryllia, ceria, zirconia, carbide, boride, nitride, silicide, porcelain, clay, quartz, alabaster, glass, kaolin, feldspar, steatite, petuntse, ferrite, earthenware, PZT, alpaca, angora, byssus, camel hair, cashmere, catgut, chiengora, guanaco, llama, mohair, pashmina, qiviut, rabbit, silk, sinew, spider silk, wool, vicuna, yak, abaca', bagasse, balsa, bamboo, coir, cotton, flax, hemp, jute, kapok, kenaf, pina, raffia, ramie, sisal, wood, asbestos, acetate, triacetate, art silk, lyocell rayon, modal rayon, rayon, glass, silica, carbon, basalt, metallic, acrylic, microfiber, modacrylic, nylon, olefin, polyester, polyethylene, spandex, vinylon, vinyon, zylon, saran, carbon-fiber-reinforced polymer, carbon-fiber-reinforced plastic, carbon-fiber reinforced thermoplastic, or carbon nanotube reinforced polymer, fiber reinforced polymer, fiberglass (including E-glass, A-glass, E-CR-glass, C-glass, D-glass, R-glass, F-glass, S-glass, S-2-glass, Hexel, or may be another type), or may be another type. In a number of variations, the medium fabric or fiber may be manufactured or woven through weaving, knitting, braiding, stitching, plain weaving, satin weaving, or may be manufactured another way.

Figure 2:
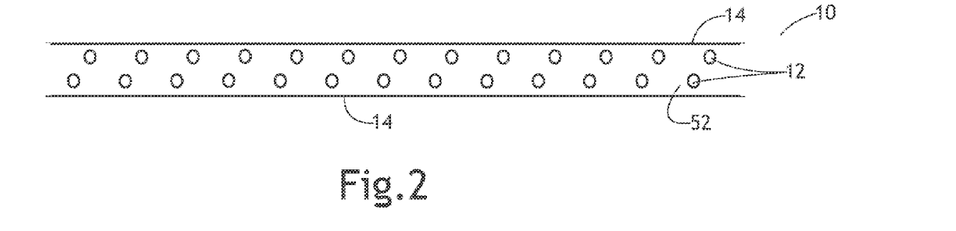
FIG. 2 is an illustration of a product and method of a fuel system according to a number of variations.

In a number of variations, the medium 14 may allow for transfer of thermal energy from the phase change material to the surroundings 20 of the housing 10 or vice versa. In a number of variations, the phase change material 12 may be contained within the housing 10 by the medium 14. In a number of variations, the phase change materials 12 may be incorporated into the fiber or fabric medium 14 by coating, lamination, finishing, melt-spinning, bi-component synthetic fiber extrusion, injection molding, foam techniques, adhesive, or may be incorporated another way. In a number of variations, the phase change material 12 encapsulated microspheres may be incorporated into or onto the fiber or fabric of the medium 14 as a coating 50. In a number of variations, the phase change encapsulated microspheres 12 may be dispersed throughout a solution for a coating 50 that may further comprise a binder 52. In a number of variations, the coating 50 may be applied to the medium 14 by brushing, spraying, blotting, masking, deposition, or may be done another way. In a number of variations, the binder 52 may be an extensible binder 52 that allows the fiber or fabric to be extensible. In a number of variations, the binder 52 may be a natural or synthetic adhesive or polymer, and may include starch, animal glue, masonite, casein, natural rubber, polychloroprene, rubber cement, white glue, urethane resin, vinylester resin, acrylic resin, cyanoacrylate resin, polyester resin, epoxy resin, phenolic resin, modified phenolic resin or may be another type. The binder 52 may be reactive or non-reactive. In a number of variations, the binder 52 may bond the phase change material 12 to the medium 14.

In a number of variations, the coating 50 may optionally further comprise a surfactant 54, a dispersant 56, an antifoam agent 58, and/or a thickener 60. In a number of variations, the surfactant 54 may comprise linear alkylbenzene sulfonates, lignin sulfonates, fatty alcohol ethoxylates, or alkylphenol ethoxylates or may be another type. In a number of variations, the dispersant 56 may comprise a colloid. In a number of variations, the antifoam agent 58 may comprise at least one of an oil based defoamer, a powder defoamer, a water based defoamer, a silicone based defoamer, and an EO/PO based defoamer, alkyl polyacrylate defoamer, or may be another type. In a number of variations, the thickener 60 may comprise polyacrylic acid, polyethylene glycol, polyurethane, PVA, gum, saccharides, proteins, castor oil, or organosilicone, or may be another type.

In a number of variations, the housing 10 may comprise a hollow enclosure of medium 14 filled with phase change material 12. In a number of variations, the medium 14 and/or the housing 10 may be elastic, bendable, malleable, ductile, or rigid. The housing 10 may be any shape (including, but not limited to, a sphere, an oval, a cube, a bag, a pyramid, a simple fridge, or an amorphous object) and any size to fit the desired application and may be modified to fit around certain aspects of the vehicle engine 22 and its components. The housing 10 may be amorphous. FIG. 1 shows one non-limiting variation of the housing 10, medium 14, and phase change material 12. In a number of variations, the housing 10 may comprise a medium layer 14 with phase change material 12 incorporated therein or thereon. FIG. 2 shows one non-limiting variation of the housing 10, medium 14, binder 52, and phase change material 12 wherein the phase change material 12 may be microencapsulated and incorporated onto or into the medium 14.

In a number of variations, the surroundings 20 of the housing 10 may contain a fuel 16. In a number of variations, the fuel 16 may be a diesel based fuel, an ethanol based fuel, a jet fuel, a gasoline fuel, a kerosene based fuel, an LPG fuel, a natural gas fuel, a hydrogen fuel, a propane fuel, or may be another type. In a number of variations, the fuel 16 may be in the surroundings 20 at a temperature, pressure, or other type of condition 30 where the fuel 16 may be in an undesirable phase in undesirable conditions 30. In a number of variations, the fuel 16 may be in a gel or wax-like state within a vehicle engine 22. In a number of variations, the temperature of the surroundings 20 being below the freezing, gel, or cloud point may cause the fuel to form a gel or wax-like state. In a number of variations, the vapor pressure of the fuel 16 within the surroundings 20 may cause the fuel 16 to form a gel or wax-like state. The fuel 16 in a gel or wax-like state may cause difficulty starting the vehicle engine 22. In a number of variations, the housing 10 may partially reverse the fuel phase change by heating the fuel 16 by thermal energy transfer from the phase change material 12 through the medium 14. In a number of variations, at or around the onset of undesirable conditions 30 for the fuel 16 and/or surroundings 20, the phase change material 12 may solidify and release thermal energy through the medium 14 into the fuel 16. The increased thermal energy to the fuel 16 may allow at least a portion of the fuel's gel or wax-like state to liquefy or melt enough to start or continue to run the vehicle engine 22 under these undesirable conditions 30 of the surroundings 20 and/or fuel 16. At desirable conditions 30 of the surroundings 20 and/or fuel 16, thermal energy from the fuel 16 may transfer through the medium 14 and into the phase change material 12 to liquefy and store latent heat within the phase change material 12 for use when the conditions 30 again become undesirable.

In a number of variations, the fuel 16 may be an ethanol based fuel 16. The ethanol based fuel 16 may have an ethanol content of 100% to about 0.1% vol. % within the ethanol based fuel 16. In some variations, the ethanol based fuel may be 100% ethanol. In some variations, the ethanol based fuel may be 85% ethanol. In some variations, the ethanol based fuel may be 70% ethanol. In a number of variations, the ethanol fuel 16 may be prone to clogging of the vehicle engine 22 within the surroundings 20 during undesirable conditions 30. This clogging may cause the vehicle engine 22 to stall or not start upon desired ignition. The undesirable conditions 30 may comprise temperatures below the ethanol fuel's 16, freezing, gel, or cloud point and may be between about 15° C. to about 12° C. In a number of variations, desirable conditions 30 may comprise temperatures above the ethanol fuel's 16 freezing, gel, or cloud point. The ethanol fuel 16 may freeze, wax, gel, or cloud in the surroundings 20 under undesirable conditions 30 and form a partially crystalline state, which may clog the vehicle engine 22. In a number of variations, the vehicle engine 22 may comprise components comprising a fuel filter 40, a fuel tank 42, a fuel line 44, or may comprise another vehicle component wherein fuel 16 may be present. In a number of variations, a housing 10 may be added to the vehicle engine 22. In a number of variations, the housing 10 may be portable and mobile for use in various portions of the surroundings 20 and vehicle engine 22, or may be attached to the vehicle engine 22 or a portion of the surroundings. In a number of variations, the housing 10 may comprise a phase change material 12 and a medium 14. In a number of variations, the medium 14 may be constructed and arranged for thermal energy transfer to or from the phase change material 12 to the surroundings of the housing 10. In a number of variations, when the conditions 30 become undesirable in the surroundings 20 and or the ethanol fuel 16, the phase change material 12 within the housing 10 may at least partially freeze or solidify, releasing thermal energy through the medium 14 and into the ethanol fuel 16. The increased thermal energy to the ethanol fuel 16 may allow at least a portion of the ethanol fuel's gel, wax-like, or crystalline state to liquefy or melt enough to start or continue to run the vehicle engine 22 under these undesirable conditions 30 of the surroundings 20 in regards to the ethanol fuel 16. In a number of variations, when the vehicle engine 22 may be running or when conditions 30 become desirable, the conditions 30 of the surroundings 20 may cause the ethanol fuel 16 to release thermal energy through the medium 14 and into the phase change material 12. The increased thermal energy to the phase change material 12 may allow at least a portion of the phase change material 12 to liquefy or melt and store this latent heat for the next occasion upon which the conditions 30 may again be undesirable. In a number of variations, the phase change material 12 may have a very high latent heat that can be stored and released upon undesirable conditions 30 for the fuel into the ethanol fuel 16 or other portions of the surroundings 20. A set of non-limiting variations of phase change materials 12 that may be useful for an ethanol based fuel 16 at undesirable conditions 30 may be found in Table 3.

In a number of variations, the fuel 16 may be a diesel based fuel 16. In a number of variations, the diesel fuel may be prone to clogging of the vehicle engine 22 within the surroundings 20 during undesirable conditions 30. This clogging may cause the vehicle engine 22 to stall or not start upon desired ignition. The undesirable conditions 30 may comprise temperatures below the diesel fuel's 16, freezing, gel, or cloud point and may be between about 15° C. to about 0° C., about 0° C. to about −10° C., or about −10° C. to about −30° C. Desirable conditions 30 may comprise temperatures above the diesel fuel's 16 freezing, gel, or cloud point. In a number of variations, the diesel fuel 16 may comprise low sulfur content or bio-diesel fuel. The diesel fuel 16 may freeze, wax, gel, or cloud in the surroundings 20 under undesirable conditions 30 and form a partially crystalline state, which may clog the vehicle engine 22. In a number of variations, the vehicle engine 22 may comprise components comprising a fuel filter 40, a fuel tank 42, a fuel line 44, or may comprise another component wherein fuel 16 may be present. In a number of variations, the vehicle engine 22 may comprise a high pressure common rail engine. In a number of variations, a housing 10 may be added to the vehicle engine 22. In a number of variations, the housing may be portable and mobile for use in various portions of the surroundings 20 and vehicle engine 22, or may be attached to the vehicle engine 22 or a portion of the surroundings 20. In a number of variations, the housing 10 may comprise a phase change material 12 and a medium 14. In a number of variations, the medium 14 may be constructed and arranged for thermal energy transfer to or from the phase change material 12 to the surroundings 20 of the housing 10. In a number of variations, when the conditions 30 become undesirable in the surroundings 20, the phase change material 12 within the housing 10 may at least partially freeze or solidify, releasing thermal energy through the medium 14 and into the diesel fuel 16. The increased thermal energy to the diesel fuel 16 may allow at least a portion of the diesel fuel's gel, wax-like, or crystalline state to liquefy or melt enough to start or continue to run the vehicle engine 22 under these undesirable conditions 30 of the surroundings 20 in regards to the diesel fuel 16. In a number of variations, when the vehicle engine 22 may be running or when conditions 30 become desirable, the conditions 30 of the surroundings 20 may cause the diesel fuel 16 to release thermal energy through the medium and into the phase change material 12. The increased thermal energy to the phase change material 12 may allow at least a portion of the phase change material 12 to liquefy or melt and store this latent heat for the next occasion upon which the conditions 30 may again be undesirable. In a number of variations, the phase change material 12 may have a very high latent heat that can be stored and released upon undesirable conditions 30 for the fuel into the diesel fuel 16 or other portions of the surroundings 20. A set of non-limiting variations of phase change materials 12 that may be useful for a diesel based fuel 16 at undesirable conditions 30 may be found in Table 4.

Figure 5:
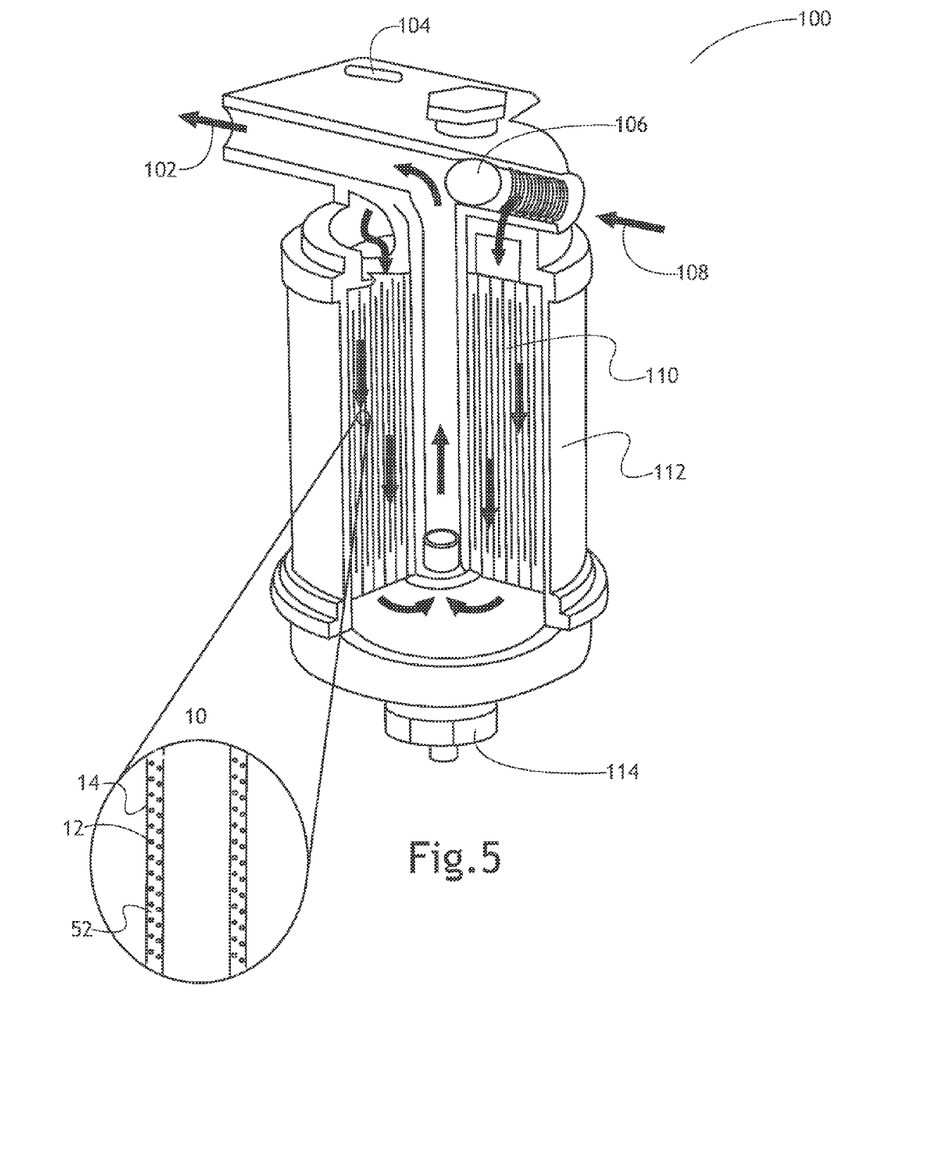
FIG. 5 is an illustration of a product and method of a fuel system according to a number of variations.
Figure 6:
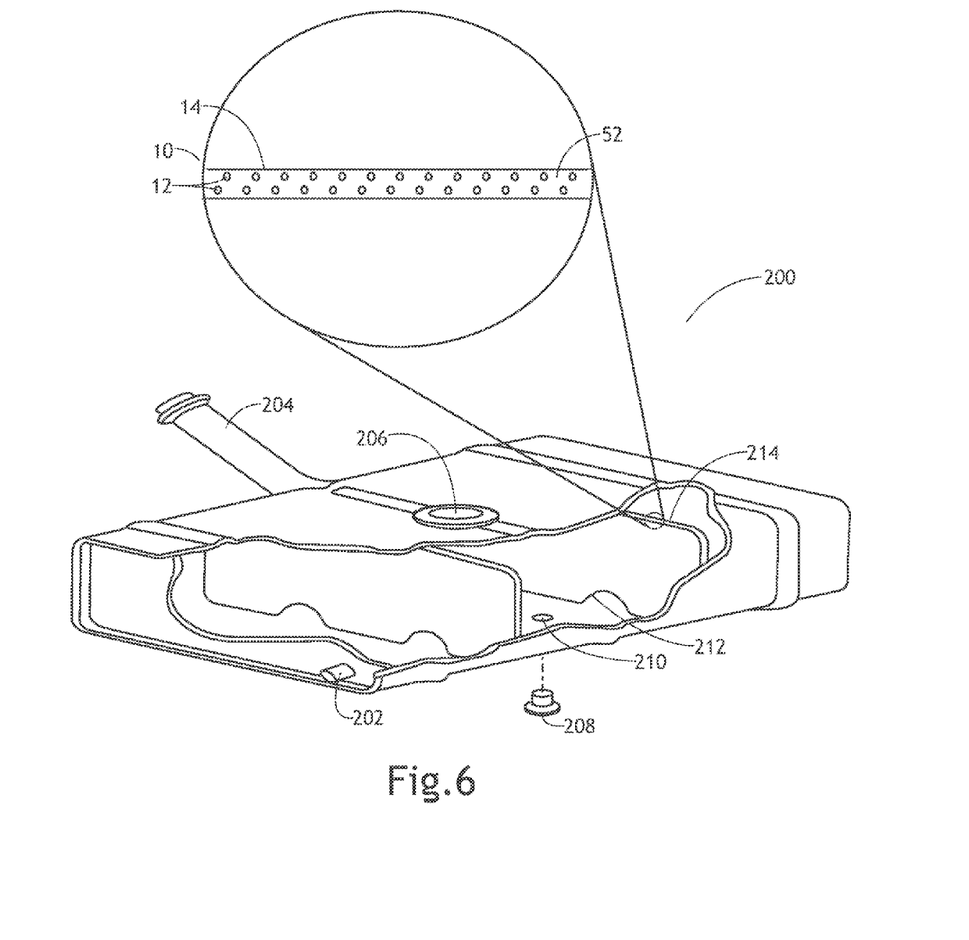
FIG. 6 is an illustration of a product and method according to a number of variations.

In a number of variations, the housing 10 may be detachable from the surroundings 20 and may be moved to areas where heating of the fuel 16 may be desired. In a number of variations, the housing 10 may be a portable insulation jacket. In a number of variations, the housing 10 may be used to partially surround a vehicle engine 22 component wherein heating of a fuel 16 may be desired. In a number of variations, the housing 10 may be attached to a portion of the surroundings 20. In a number of variations, the housing 10 may be fixed or otherwise attached to a portion of the vehicle engine 22. In a number of variations, the housing 10 may be incorporated into the vehicle filter so that it may be adjacent to or in contact with the flow or static state of a fuel. FIG. 5 shows one non-limiting variation wherein the housing 10 may be in the form of a layer adjacent to or in contact with the flow or static state of a fuel 16 within a fuel filter component 100 within a vehicle engine 22. The fuel filter component 100 may optionally include, among other things, a fuel outlet 102, a flange 104, a non-return valve 106, a fuel inlet 108, a filter element 110, a filter housing 112, and a dewatering screw 114. In a number of variations, the housing 10 may be incorporated into the filter housing 112 or the filter element 110. In a number of variations, the housing 10 may be incorporated into a vehicle fuel line or fuel tank component of a vehicle engine 22. FIG. 6 shows one non-limiting variation wherein the housing 10 may be in the form of a layer adjacent to or in contact with the flow or static state of a fuel 16 within a tank component 200. The tank component 200 may optionally include, among other things, a fuel outlet 202, a filler pipe 204, a fuel gage opening 206, a drainplug 208, a drain 210, a passage 212 (for fuel transport), and at least one baffle 214. In a number of variations, the housing 10 may be incorporated anywhere in the tank component 200. In a number of variations, the housing 10 may be incorporated into baffle 214.

In a number of variations, a method may be shown wherein the method includes providing a product including a housing 10 comprising at least one phase change material 12 and a medium 14 constructed and arranged for thermal energy transfer to or from a vehicle fuel 16. In a number of variations, the method further includes providing a vehicle comprising a container comprising vehicle fuel 16. In a number of variations, the method further includes placing the product so that the medium 14 may be in contact with or adjacent to the container of vehicle fuel or the fuel 16 itself. In a number of variations, the method further includes transferring heat to the fuel 16 from the phase change material 12 or transferring heat from the fuel 16 to the phase change material 12. In a number of variations, the method further includes starting or preventing the stalling of a vehicle due to transferred heat from the phase change material 12 to the vehicle fuel 16. A container may be herein defined as a vessel that at least partially surrounds or encompasses a volume of fuel. In a number of variations, a vehicle component may comprise a container. In a number of variations, a vehicle engine 22 may comprise a container. In a number of variations at least one of one of a fuel tank, a fuel filter, or a fuel line of a vehicle may comprise a container.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

Variation 1 may include a product including a housing, comprising at least one phase change material and a medium, wherein the housing is constructed and arranged for thermal energy transfer to or from a fuel.

Variation 2 may include a product as set forth in Variation 1 wherein the fuel comprises a diesel based fuel.

Variation 3 may include a product as set forth in Variation 1 wherein the fuel comprises an ethanol based fuel.

Variation 4 may include a product as set forth in any of Variations 1-3 wherein the medium comprises a layer in contact with or adjacent to a flow or static state of the fuel.

Variation 5 may include a product as set forth in any of Variations 1-4 wherein the housing comprises at least one of a vehicle fuel filter component, a vehicle fuel tank component, or a portable insulation jacket.

Variation 6 may include a product as set forth in any of Variations 1-5 wherein the phase change material further comprises encapsulated microspheres.

Variation 7 may include a product as set forth in Variation 6 wherein the medium comprises phase change material encapsulated microspheres incorporated into a coating applied to a fiber or fabric.

Variation 8 may include a product as set forth in Variation 7 wherein the coating further comprises an extensible binder.

Variation 9 may include a product as set forth in Variation 5 wherein the housing further comprises a baffle of a fuel tank.

Variation 10 may include a product as set forth in any of Variations 1-9 wherein the phase change material is constructed and arranged to solidify and release thermal energy to the fuel through the medium at temperatures at, around, or below the freezing, gel, or cloud point of the fuel.

Variation 11 may include a product as set forth in any of Variations 1-10 wherein the phase change material is constructed and arranged to liquefy and collect thermal energy above the freezing, gel, or cloud point of the fuel.

Variation 12 may include a product including a fuel system for use in at least one vehicle component comprising a housing, comprising at least one phase change material and a medium, wherein the housing is constructed and arranged for thermal energy transfer to or from a vehicle fuel.

Variation 13 may include a method including providing a product including a housing, comprising at least one phase change material and a medium, wherein the housing is constructed and arranged for thermal energy transfer to or from a vehicle fuel; providing a vehicle comprising a container comprising vehicle fuel; placing the product so that the medium is in contact with or adjacent to the container of vehicle fuel or the fuel itself; transferring heat to the fuel from the phase change material or transferring heat from the fuel to the phase change material.

Variation 14 may include a method as set forth in Variation 13 wherein the fuel comprises a diesel based fuel.

Variation 15 may include a method as set forth in Variation 13 wherein the fuel comprises an ethanol based fuel.

Variation 16 may include a method as set forth in any of Variations 13-15 wherein the phase change material is constructed and arranged to solidify and release thermal energy to the fuel through the medium at temperatures at, around, or below the freezing, gel, or cloud point of the fuel.

Variation 17 may include a method as set forth in any of Variations 13-16 wherein the phase change material is constructed and arranged to liquefy and collect thermal energy above the freezing, gel, or cloud point of the fuel.

Variation 18 may include a method as set forth in any of Variations 13-17 wherein the phase change material further comprises encapsulated microspheres.

Variation 19 may include a method as set forth in any of Variations 13-18 wherein the housing comprises phase change material encapsulated microspheres incorporated into a coating applied to a medium comprising a fiber or fabric.

Variation 20 may include a method as set forth in any of Variations 13-19 wherein the housing comprises a portable insulation jacket.

Variation 21 may include a method as set forth in any of Variations 13-20 wherein the method further includes starting or preventing the stalling of a vehicle due to transferred heat from the phase change material to the vehicle fuel.

Variation 22 may include a method as set forth in any of Variations 13-21 wherein a fuel tank, a fuel filter, or a fuel line of a vehicle comprises a container.

Variation 23 may include a product as set forth in any of Variations 1-12 wherein the phase change material comprises a material with a freezing, gel, or cloud point at or slightly above the freezing, gel, or cloud point of the fuel.

Variation 24 may include a product as set forth in any of Variations 1-12 and 23 wherein the phase change material is organic.

Variation 25 may include a product as set forth in any of Variations 1-12 and 23-24 wherein the phase change material is renewable.

Variation 26 may include a product as set forth in any of Variations 1-12 and 23-25 wherein the phase change material is self-contained.

Variation 27 may include a product as set forth in any of Variations 1-12 and 23-26 wherein the phase change material is microencapsulated by a polymer comprising polyuria-formaldehyde.

Variation 28 may include a product as set forth in any of Variations 1-12 and 23-27 wherein the phase change material is renewable.

Variation 29 may include a product as set forth in any of Variations 1-12 and 23-28 wherein the medium comprises at least one of shellac, amber, aramid (including Twaron, Kevlar, Technora, Nomax), silk, rubber, synthetic rubber, phenol formaldehyde, neoprene, nylon, polyvinyl chloride, polystyrene, polyethylene, polypropylene, polyacrylonitrile, PVB, silicone, plastic, bioplastic, PET, PVDC, PA PTFE, PEO, PPY, PANT, PT, PPS, PPV, PAC, polyester, vinyl polymer, polyolefin, polyacetylene, phenolic resin, polyanhydride, epoxy, phenolic, polyimide, PEEK, alumina, beryllia, ceria, zirconia, carbide, boride, nitride, silicide, porcelain, clay, quartz, alabaster, glass, kaolin, feldspar, steatite, petuntse, ferrite, earthenware, PZT, alpaca, angora, byssus, camel hair, cashmere, catgut, chiengora, guanaco, llama, mohair, pashmina, qiviut, rabbit, silk, sinew, spider silk, wool, vicuna, yak, abaca', bagasse, balsa, bamboo, coir, cotton, flax, hemp, jute, kapok, kenaf, pina, raffia, ramie, sisal, wood, asbestos, acetate, triacetate, art silk, lyocell rayon, modal rayon, rayon, glass, silica, carbon, basalt, metallic, acrylic, microfiber, modacrylic, nylon, olefin, polyester, polyethylene, spandex, vinylon, vinyon, zylon, saran, carbon-fiber-reinforced polymer, carbon-fiber-reinforced plastic, carbon-fiber reinforced thermoplastic, or carbon nanotube reinforced polymer, fiber reinforced polymer, or fiberglass.

Variation 30 may include a product as set forth in any of Variations 1-12 and 23-29 wherein the medium is manufactured or woven through one of through weaving, knitting, braiding, stitching, plain weaving, satin weaving.

Variation 31 may include a product as set forth in any of Variations 1-12 and 23-30 wherein the phase change material is incorporated into the medium by coating, lamination, finishing, melt-spinning, bi-component synthetic fiber extrusion, injection molding, foam techniques, or adhesive.

Variation 32 may include a product as set forth in any of Variations 1-12 and 23-31 wherein the phase change material is incorporated into or onto the medium by coating comprising at least one of a binder, surfactant, dispersant, anti-foam agent, or thickener.

Variation 33 may include a product as set forth in any of Variations 1-12 and 23-32 wherein the coating is applied to the medium by brushing, spraying, blotting, masking, deposition.

Variation 34 may include a product as set forth in any of Variations 1-12 and 23-33 wherein the binder comprises at least one of starch, animal glue, masonite, casein, natural rubber, polychloroprene, rubber cement, white glue, urethane resin, vinylester resin, acrylic resin, cyanoacrylate resin, polyester resin, epoxy resin, phenolic resin, or modified phenolic resin.

Variation 35 may include a product as set forth in any of Variations 1-12 and 23-34 wherein the binder is reactive.

Variation 36 may include a product as set forth in any of Variations 1-12 and 23-35 wherein the surfactant comprises at least one of linear alkylbenzene sulfonates, lignin sulfonates, fatty alcohol ethoxylates, or alkylphenol ethoxylates Variation 37 may include a product as set forth in any of Variations 1-12 and 23-36 wherein the dispersant comprises a colloid.

Variation 38 may include a product as set forth in any of Variations 1-12 and 23-37 wherein the antifoam agent comprises at least one of an oil based defoamer, a powder defoamer, a water based defoamer, a silicone based defoamer, a EO/PO based defoamer, or a alkyl polyacrylate defoamer, Variation 39 may include a product as set forth in any of Variations 1-12 and 23-38 wherein the thickener comprises at least one of a polyacrylic acid, polyethylene glycol, polyurethane, PVA, gum, saccharides, proteins, castor oil, or an organosilicone.

Variation 40 may include a product as set forth in any of Variations 1-12 and 23-39 wherein the surfactant comprises at least one of linear alkylbenzene sulfonates, lignin sulfonates, fatty alcohol ethoxylates, or alkylphenol ethoxylates Variation 41 may include a product as set forth in any of Variations 1-12 and 23-40 wherein the housing is elastic, or malleable.

Variation 42 may include a product as set forth in any of Variations 1-12 and 23-41 wherein the fuel comprises at least one of a diesel based fuel, an ethanol based fuel, a jet fuel, a gasoline fuel, a kerosene based fuel, an LPG fuel, a natural gas fuel, a hydrogen fuel, or a propane fuel.

Variation 43 may include a product as set forth in any of Variations 1-12 and 23-42 wherein the fuel is at least 70% ethanol.

Variation 44 may include a product as set forth in any of Variations 1-12 and 23-43 wherein the housing is portable, detachable, and/or mobile.

Variation 45 may include a product as set forth in any of Variations 1-12 and 23-44 wherein the phase change material has a heat of fusion greater than 140 KJ/kg.

Variation 46 may include a product as set forth in any of Variations 1-12 and 23-45 wherein the fuel has a freezing, gel, or cloud point of about 12° C.

Variation 47 may include a product as set forth in any of Variations 1-12 and 23-46 wherein the fuel has a freezing, gel, or cloud point of about 15° C. to about 0° C.

Variation 48 may include a product as set forth in any of Variations 1-12 and 23-47 wherein the phase change material has a freezing, gel, or cloud point of about 0° C. to about −10° C.

Variation 49 may include a product as set forth in any of Variations 1-12 and 23-48 wherein the phase change material has a freezing, gel, or cloud point of about −10° C. to about −30° C.

Variation 50 may include a product as set forth in any of Variations 1-12 and 23-49 wherein the phase change material has a heat of fusion greater than 150 KJ/kg.

Variation 51 may include a product as set forth in any of Variations 1-12 and 23-50 wherein the vehicle engine comprises a high pressure common rail engine.

Variation 52 may include a product as set forth in any of Variations 1-12 and 23-51 wherein the fuel is low-sulfur content diesel or biodiesel.

Variation 53 may include a product as set forth in any of Variations 1-12 and 23-52 wherein the housing is attached to and at least partially surrounds a vehicle engine component.

Variation 54 may include a method as set forth in any of Variations 13-22 wherein the phase change material comprises a material with a freezing, gel, or cloud point at or slightly above the freezing, gel, or cloud point of the fuel.

Variation 55 may include a method as set forth in any of Variations 13-22 and 54 wherein the phase change material is organic.

Variation 56 may include a method as set forth in any of Variations 13-22 and 54-55 wherein the phase change material is renewable.

Variation 57 may include a method as set forth in any of Variations 13-22 and 54-56 wherein the phase change material is self-contained.

Variation 58 may include a method as set forth in any of Variations 13-22 and 54-57 wherein the phase change material is microencapsulated by a polymer comprising polyuria-formaldehyde.

Variation 59 may include a method as set forth in any of Variations 13-22 and 54-58 wherein the phase change material is renewable.

Variation 60 may include a method as set forth in any of Variations 13-22 and 54-59 wherein the medium comprises at least one of shellac, amber, aramid (including Twaron, Kevlar, Technora, Nomax), silk, rubber, synthetic rubber, phenol formaldehyde, neoprene, nylon, polyvinyl chloride, polystyrene, polyethylene, polypropylene, polyacrylonitrile, PVB, silicone, plastic, bioplastic, PET, PVDC, PA PTFE, PEO, PPY, PANT, PT, PPS, PPV, PAC, polyester, vinyl polymer, polyolefin, polyacetylene, phenolic resin, polyanhydride, epoxy, phenolic, polyimide, PEEK, alumina, beryllia, ceria, zirconia, carbide, boride, nitride, silicide, porcelain, clay, quartz, alabaster, glass, kaolin, feldspar, steatite, petuntse, ferrite, earthenware, PZT, alpaca, angora, byssus, camel hair, cashmere, catgut, chiengora, guanaco, llama, mohair, pashmina, qiviut, rabbit, silk, sinew, spider silk, wool, vicuna, yak, abaca', bagasse, balsa, bamboo, coir, cotton, flax, hemp, jute, kapok, kenaf, pina, raffia, ramie, sisal, wood, asbestos, acetate, triacetate, art silk, lyocell rayon, modal rayon, rayon, glass, silica, carbon, basalt, metallic, acrylic, microfiber, modacrylic, nylon, olefin, polyester, polyethylene, spandex, vinylon, vinyon, zylon, saran, carbon-fiber-reinforced polymer, carbon-fiber-reinforced plastic, carbon-fiber reinforced thermoplastic, or carbon nanotube reinforced polymer, fiber reinforced polymer, or fiberglass.

Variation 61 may include a method as set forth in any of Variations 13-22 and 54-60 wherein the medium is manufactured or woven through one of through weaving, knitting, braiding, stitching, plain weaving, satin weaving.

Variation 62 may include a method as set forth in any of Variations 13-22 and 54-61 wherein the phase change material is incorporated into the medium by coating, lamination, finishing, melt-spinning, bi-component synthetic fiber extrusion, injection molding, foam techniques, or adhesive.

Variation 63 may include a method as set forth in any of Variations 13-22 and 54-62 wherein the phase change material is incorporated into or onto the medium by coating comprising at least one of a binder, surfactant, dispersant, anti-foam agent, or thickener.

Variation 64 may include a method as set forth in any of Variations 13-22 and 54-63 wherein the coating is applied to the medium by brushing, spraying, blotting, masking, or deposition.

Variation 65 may include a method as set forth in any of Variations 13-22 and 54-64 wherein the binder comprises at least one of starch, animal glue, masonite, casein, natural rubber, polychloroprene, rubber cement, white glue, urethane resin, vinylester resin, acrylic resin, cyanoacrylate resin, polyester resin, epoxy resin, phenolic resin, or modified phenolic resin.

Variation 66 may include a method as set forth in any of Variations 13-22 and 54-65 wherein the binder is reactive.

Variation 67 may include a method as set forth in any of Variations 13-22 and 54-66 wherein the surfactant comprises at least one of linear alkylbenzene sulfonates, lignin sulfonates, fatty alcohol ethoxylates, or alkylphenol ethoxylates Variation 68 may include a method as set forth in any of Variations 13-22 and 54-67 wherein the dispersant comprises a colloid.

Variation 69 may include a method as set forth in any of Variations 13-22 and 54-68 wherein the antifoam agent comprises at least one of an oil based defoamer, a powder defoamer, a water based defoamer, a silicone based defoamer, a EO/PO based defoamer, or a alkyl polyacrylate defoamer, Variation 70 may include a method as set forth in any of Variations 13-22 and 54-69 wherein the thickener comprises at least one of a polyacrylic acid, polyethylene glycol, polyurethane, PVA, gum, saccharides, proteins, castor oil, or an organosilicone.

Variation 71 may include a method as set forth in any of Variations 13-22 and 54-70 wherein the surfactant comprises at least one of linear alkylbenzene sulfonates, lignin sulfonates, fatty alcohol ethoxylates, or alkylphenol ethoxylates Variation 72 may include a method as set forth in any of Variations 13-22 and 54-71 wherein the housing is elastic, or malleable.

Variation 73 may include a method as set forth in any of Variations 13-22 and 54-72 wherein the fuel comprises at least one of a diesel based fuel, an ethanol based fuel, a jet fuel, a gasoline fuel, a kerosene based fuel, an LPG fuel, a natural gas fuel, a hydrogen fuel, or a propane fuel.

Variation 74 may include a method as set forth in any of Variations 13-22 and 54-73 wherein the fuel is at least 70% ethanol.

Variation 75 may include a method as set forth in any of Variations 13-22 and 54-74 wherein the housing is portable, detachable, and/or mobile.

Variation 76 may include a method as set forth in any of Variations 13-22 and 54-75 wherein the phase change material has a heat of fusion greater than 140 KJ/kg.

Variation 77 may include a method as set forth in any of Variations 13-22 and 54-76 wherein the fuel has a freezing, gel, or cloud point of about 12° C.

Variation 78 may include a method as set forth in any of Variations 13-22 and 54-77 wherein the fuel has a freezing, gel, or cloud point of about 15° C. to about 0° C.

Variation 79 may include a method as set forth in any of Variations 13-22 and 54-78 wherein the phase change material has a freezing, gel, or cloud point of about 0° C. to about −10° C.

Variation 80 may include a method as set forth in any of Variations 13-22 and 54-79 wherein the phase change material has a freezing, gel, or cloud point of about −10° C. to about −30° C.

Variation 81 may include a method as set forth in any of Variations 13-22 and 54-80 wherein the phase change material has a heat of fusion greater than 150 KJ/kg.

Variation 82 may include a method as set forth in any of Variations 13-22 and 54-81 wherein the vehicle engine comprises a high pressure common rail engine.

Variation 83 may include a method as set forth in any of Variations 13-22 and 54-82 wherein the fuel is low-sulfur content diesel or biodiesel.

Variation 84 may include a method as set forth in any of Variations 1-12 and 54-83 wherein the housing is attached to and at least partially surrounds a vehicle engine component.

The above description of select variations is merely illustrative in nature and, thus, variations or variants thereof are not to be regarded as a departure from the spirit and scope of the invention.

What is claimed is:

1. A product comprising:
a housing, comprising at least one phase change material and a medium, wherein the housing is constructed and arranged for thermal energy transfer to or from a fuel wherein the medium comprises a layer in contact with or adjacent to a flow or static state of the fuel wherein the phase change material does not include an icosane or decane and wherein the phase change material is encapsulated by a polymer comprising polyuria-formaldehyde.

2. A product as set forth in claim 1 wherein the fuel comprises a diesel based fuel.

3. A product as set forth in claim 1 wherein the fuel comprises an ethanol based fuel.

4. A product as set forth in any of claim 1 wherein the housing comprises at least one of a vehicle fuel filter component, a vehicle fuel tank component, or a portable insulation jacket.

5. A product as set forth in any of claim 1 wherein the phase change material further comprises encapsulated microspheres.

6. A product as set forth in claim 5 wherein the encapsulated microspheres are incorporated into a coating applied to a fiber or fabric.

7. A product as set forth in claim 6 wherein the coating further comprises an extensible binder.

8. A product as set forth in claim 4 wherein the housing further comprises a baffle of a fuel tank.

9. A product as set forth in claim 1 wherein the phase change material is constructed and arranged to solidify and release thermal energy to the fuel through the medium at temperatures at, around, or below the freezing, gel, or cloud point of the fuel.

10. A product as set forth in claim 1 wherein the phase change material is constructed and arranged to liquefy and collect thermal energy above the freezing, gel, or cloud point of the fuel.

11. A product comprising:
a fuel system for use in at least one vehicle component comprising a housing, comprising at least one phase change material and a medium, wherein the housing is constructed and arranged for thermal energy transfer to or from a vehicle fuel wherein the medium comprises a layer in contact with or adjacent to a flow or static state of the fuel wherein the phase change material does not include an icosane or decane and wherein the phase change material is encapsulated by a polymer comprising polyuria-formaldehyde.

12. A method comprising:
providing a product including a housing, comprising at least one phase change material and a medium, wherein the housing is constructed and arranged for thermal energy transfer to or from a vehicle fuel wherein the medium comprises a layer in contact with or adjacent to a flow or static state of the fuel;
providing a vehicle comprising a container comprising vehicle fuel;
placing the product so that the medium is in contact with or adjacent to the container of vehicle fuel or the fuel itself;
transferring heat to the fuel from the phase change material or transferring heat from the fuel to the phase change material wherein the phase change material does not include an icosane or decane and wherein the phase change material is encapsulated by a polymer comprising polyuria-formaldehyde.

13. A method as set forth in claim 12 wherein the fuel comprises a diesel based fuel.

14. A method as set forth in claim 12 wherein the fuel comprises an ethanol based fuel.

15. A method as set forth in claim 12 wherein the phase change material is constructed and arranged to solidify and release thermal energy to the fuel through the medium at temperatures at, around, or below the freezing, gel, or cloud point of the fuel.

16. A method as set forth in claim 12 wherein the phase change material is constructed and arranged to liquefy and collect thermal energy above the freezing, gel, or cloud point of the fuel.

17. A method as set forth in claim 12 wherein the phase change material further comprises encapsulated microspheres.

18. A method as set forth in claim 17 wherein the encapsulated microspheres are incorporated into a coating applied to a medium comprising fiber or fabric.

19. A method as set forth in claim 12 wherein the housing comprises a portable insulation jacket.

20. A product as set forth in claim 1 wherein the medium comprises a fiber or fabric.

21. A product as set forth in claim 7 wherein the phase change material is bonded to the medium by the binder.

22. A product as set forth in claim 1 wherein the medium is static.

* * * * *